Oct. 15, 1940.                J. PRICE                2,218,050
                     WASTE PIPE CLEANING MACHINE
                         Filed Nov. 16, 1938
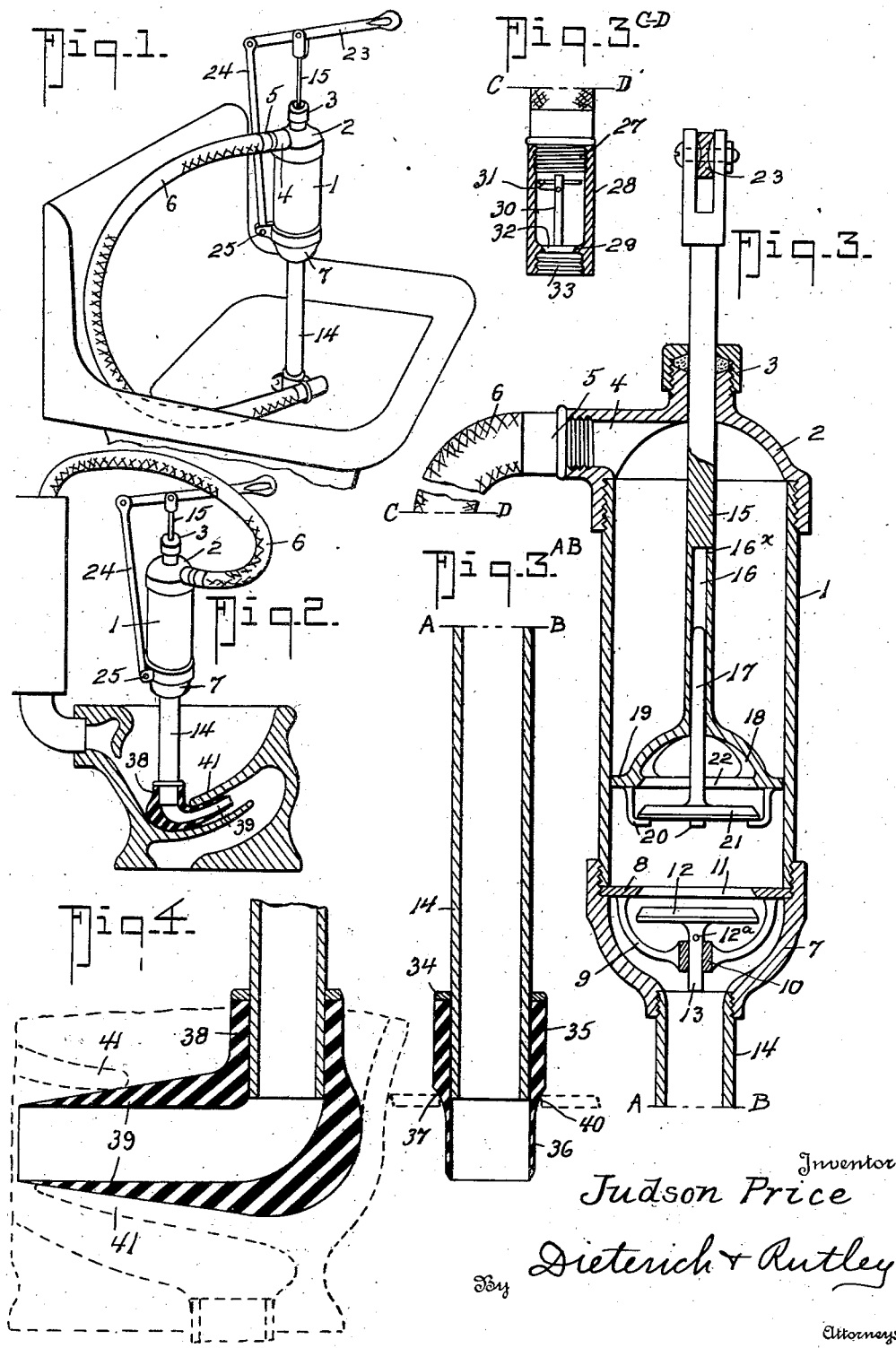
Inventor
Judson Price
By Dieterich & Rutley
Attorneys.

Patented Oct. 15, 1940

2,218,050

UNITED STATES PATENT OFFICE 2,218,050

WASTE PIPE CLEANING MACHINE

Judson Price, Dexter, Mo.

Application November 16, 1938, Serial No. 240,826

1 Claim. (Cl. 4—257)

My invention relates to certain new and useful improvements in means to clean clogged waste pipes in sinks, laundry tubs, toilets, etc., and it particularly has for its object to provide a simple, effective and inexpensive apparatus for the purpose.

More in detail, the invention has for its object to provide a force pump arrangement with a resilient, flexible fitting on a rigid pump tube that will act as a plug or sealing stopper between the pump leg and the entrance to the sink, toilet, etc., opening to be flushed.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claim, reference being had to the accompanying drawing, in which—

Fig. 1 is a perspective view of the apparatus in use as a sink drain cleaner.

Fig. 2 is a perspective view of the apparatus in use as a cleaner for toilet seats.

Figs. 3, 3A-B and 3C-D constitute (when A-B is connected to A-B and C-D to C-D) a central vertical section of the apparatus for sink or straight-way drain cleaning.

Fig. 4 is a detail view of the attachment for toilet bowl openings.

In the drawing, in which like numbers of reference indicate like parts in all figures, 1 is the pump cylinder, the ends of which are threaded to receive the cap 2 and base 7. The cap has a gland through which the pump rod 15 works and it has an inlet opening 4 into which the coupling 5 of the hose 6 is screwed.

The base 7 is shouldered to engage and hold the valve seat cage 8 securely in place against the cylinder 1.

The member 8 includes the valve seat proper 11 and the spider 9 which has a bearing 10 for the stem 13 of the valve 12, a pin 12ª serving to limit the drop of the valve 12 from its seat 11.

The base 7 has a threaded outlet into which a rigid pipe 14 is screwed, the pipe having, near its lower end, a flange 34 serving as a shoulder to be engaged by the flexible resilient (rubber) fitting that acts as a seal between the pipe 14 and the outlet of the sink, basin, tub or toilet to be cleared. When a sink, basin or tub having a straight-down outlet is to be cleared, this fitting comprises a tubular body 35 having a tapered portion 37 and a thin end 36 to wedge into the opening 40 (see dotted lines, Fig. 3A-B). When the apparatus is to be used to clear toilets, an angular fitting is used. This fitting comprises a body 38 to fit on the pipe 14 (as does 35 in the case above referred to) and a tapered flexible elastic portion 39 projected with its axis at right angles to the pipe 14 (see Fig. 2, and dotted lines of Fig. 4) to wedge into the toilet duct 41.

At its entrant end the hose (flexible) 6 has a coupling 27 threaded into a receiving nozzle 28 which has a valve seat 29 and in which floats a valve 32 whose stem has crossed pins 31 serving to center the valve stem and also to prevent (by contact with 27) the valve from leaving its seat too far.

A handle 23 is pivoted to the upper end of the rod 15 and is connected, by a rigid link 25, pivoted at one end to the handle, with the base 7 by a pivotal connection 26 (see Figs. 1 and 2).

The rod 15 carries a piston 19 by a spider 18, and has fingers 20 which support a valve 21 that cooperates with a seat 22 of the piston's passage. The rod 16 is hollowed at 16 to receive the valve stem 17, a vent 16ˣ allowing free rise and fall of the stem in the space 16.

In operation, the apparatus is placed in the entrance of the duct to be cleared, as shown in Figs. 1 and 2, and the hose 6 is placed with its end 28 under water and lever 23 is raised and lowered with one hand while cylinder 1 is held down by the other hand. On the up-stroke of the piston 19, valve 12 closes, as does also valve 32. On the down-stroke valve 32 opens, while valve 21 closes and water is drawn through hose pipe 6 into cylinder 1 above piston 19. On raising the piston again the water above the piston passes through valve seat passage 22 in piston 19 and on the next down-stroke of the piston is forced through valve seat passage 11 into pipe 14 and through 35, 36, or 38, 39, as the case may be, into the duct to be cleared.

If the hose 6 is too short to reach the water supply, an additional length may be screwed into the threaded end 33 of the member 28.

From the foregoing description, taken in connection with the accompanying drawing, it is thought the construction, operation and advantages of the invention will be clear to anyone skilled in the art.

What I claim is:

In apparatus for the purposes described, wherein is provided a force pump having a flexible suction line and a rigid discharge duct; the combination with the discharge duct, of a flange adjacent the discharge end of the duct but spaced a distance therefrom, and a flexible elastic fitting on said discharge end below the flange, said fitting comprising a relatively thick body portion on the duct and a relatively thin elongated tapered portion projecting beyond the end of the duct, said projecting portion extending at approximately right angles to the body portion and having its wall tapered toward the outlet end, said tapered portion being constructed to enter and plug the drain opening of a toilet seat.

JUDSON PRICE.